United States Patent [19]
Jacus et al.

[11] Patent Number: 5,607,796
[45] Date of Patent: Mar. 4, 1997

[54] RECHARGEABLE ALKALINE ELECTROCHEMICAL CELL

[75] Inventors: Robert J. Jacus; Janna L. Rose, both of Madison, Wis.

[73] Assignee: Rayovac Corporation, Madison, Wis.

[21] Appl. No.: 669,144

[22] Filed: Jun. 24, 1996

[51] Int. Cl.$^6$ .................................................. H01M 4/66
[52] U.S. Cl. .......................... 429/165; 429/206; 429/224; 429/245
[58] Field of Search ..................................... 429/164, 165, 429/206, 224, 229, 245

[56]  References Cited

U.S. PATENT DOCUMENTS

| | | | |
|---|---|---|---|
| 2,993,947 | 7/1961 | Lieger | 429/165 X |
| 4,942,101 | 7/1990 | Audebert et al. | 429/165 X |
| 5,051,323 | 9/1991 | Murphy | 429/165 |
| 5,112,705 | 5/1992 | Hunter et al. | 429/206 |

*Primary Examiner*—Anthony Skapars
*Attorney, Agent, or Firm*—Thomas D. Wilhelm; Brian R. Tumm

[57]  ABSTRACT

This invention pertains to rechargeable zinc alkaline electrochemical cells. In cells of the invention, the anode current collector comprises copper, and from about 0.5% by weight to about 11% silicon. Preferred compositions for the anode current collector comprise from about 1% by weight silicon to about 6% by weight silicon. Cells embodying anode current collectors of the invention exhibit reduced current flow under anode polarization in alkaline conditions, and reduced cell expansion under abusive electrical drain conditions. The cells are less susceptible to oxidation of the anode current collector, which is typically irreversible, than known brass anode current collectors. In general, cells of the invention are less susceptible to, and generally do not exhibit as much, irreversible chemical reaction activity, as conventional current collectors, especially oxidation of copper at the anode current collector.

20 Claims, 2 Drawing Sheets

5,607,796

RECHARGEABLE ALKALINE ELECTROCHEMICAL CELL

This application claims priority under 35 U.S.C. 120 from Provisional Application Ser. No. 60/015,368, filed Apr. 12, 1996, herein incorporated by reference in its entirety.

FIELD OF THE INVENTION

This invention relates to rechargeable, and thus secondary, alkaline manganese dioxide electrochemical cells having zinc anodes. In particular, this invention relates to anode current collectors for rechargeable alkaline manganese dioxide cells. The current collectors have primarily copper compositions including minor, but functionally important, amounts of silicon.

BACKGROUND OF THE INVENTION

It is known that use of manganese dioxide as an active cathode material in a rechargeable alkaline secondary cell is optimized if the discharge capacity is limited to one electron-reduction of manganese dioxide. If the reduction proceeds beyond the one electron transfer, that portion of the manganese compound, which so proceeds, cannot be recharged. This is particularly true in the presence of highly conductive alkaline electrolytes.

If such a rechargeable cell were provided with a zinc anode having an electrochemical capacity equal to or higher than the one electron discharge capacity of the manganese dioxide cathode, then discharge of the cell would have to be terminated at the end of the one-electron reduction, in order to preserve efficient rechargeability of the cell.

To overcome the problems discussed above, the practice of "zinc limitation" is now known. Using zinc limitation, the quantity of zinc used in the anode has a pre-determined oxidation capacity equal to or less than the corresponding reduction capacity of the active manganese dioxide in the cathode at the single electron limit. The respective reaction "rate" capacities are, of course, separate and distinct parameters, not in general addressed here.

Thus, when the zinc reaction capacity is exhausted, even though there may be active manganese dioxide left in the cathode, the cell cannot be discharged further, of its own power, because the reaction capacity of the zinc anode has been depleted. The voltage of a single such cell goes to approximately zero, if it remains connected to a load.

However, if the cell is connected in series with at least one additional cell which still has some ampere-hour capacity left, then the exhausted cell can be subjected to reverse polarity (also referred to herein as Series Reversal) if the cell remains connected to the load and in series with the other cell. Namely, the one or more cells which are still active force current to pass through the exhausted cell, thus creating the reverse polarity.

Reversing polarity in a primary (disposable) cell under such conditions is of lesser consequence because the polarity reversal occurs after the cell has been fully discharged and therefore its useful life has been exhausted. Reversing polarity in a secondary (rechargeable) cell, however, has real consequences because, after the zinc has been depleted in a secondary cell, detrimental irreversible electrochemical changes occur in the cell. The mere fact that a secondary cell has been fully discharged does not mean that its cycle life has been exhausted. Rather, the cell will typically be recharged, and discharged to produce useful work again, and again.

Since a rechargeable cell is intended to be cycled through several, preferably many, discharge/recharge cycles during its useful life, such irreversible chemical changes can greatly reduce the useful life of the cell. Thus, in a rechargeable cell, it is important to minimize, preferably eliminate or avoid, irreversible chemical reactions. Rather, all chemical reactions should preferably be completely reversible. The higher the degree of reversibility the greater the prospect for extended cell life.

It is an object of this invention to provide a secondary alkaline zinc-manganese dioxide cell having a novel anode current collector with reduced susceptibility to oxidation, especially irreversible oxidation.

It is another object to provide a secondary alkaline zinc-manganese dioxide cell having an anode current collector exhibiting low internal resistance and wherein the susceptibility of the current collector composition to oxidation is significantly reduced.

It is still another object to provide a secondary alkaline zinc-manganese dioxide cell having an anode current collector having low internal resistance, the current collector composition being modified by inclusion of up to about 11% by weight silicon.

It is a further object to provide a secondary alkaline zinc-manganese dioxide cell which proceeds through substantially only chemically reversible reactions during normal discharge and charge stages of the discharge/charge cycle.

SUMMARY OF THE DISCLOSURE

Some of the objects are obtained in a first family of embodiments wherein a rechargeable alkaline electrochemical cell comprises a cathode, a cathode current collector, a zinc anode, an anode current collector, an alkaline electrolyte, and a separator. The anode current collector comprises copper, and about 0.5% by weight to about 11% by weight silicon. In preferred compositions, the anode current collector comprises about 1% to about 6%, more preferably about 2% to about 5%, still more preferably about 2.8% to about 4% silicon. The anode current collector preferably further comprises about 0.1% by weight to about 0.5% by weight manganese. The separator typically has a first barrier layer, and a second absorbent layer.

In general, the cells are zinc limited to one electron discharge in the cathode. In general, the cells proceed through substantially only chemically reversible reactions during normal discharge and charge stages of the discharge/charge cycle.

Figure 1:
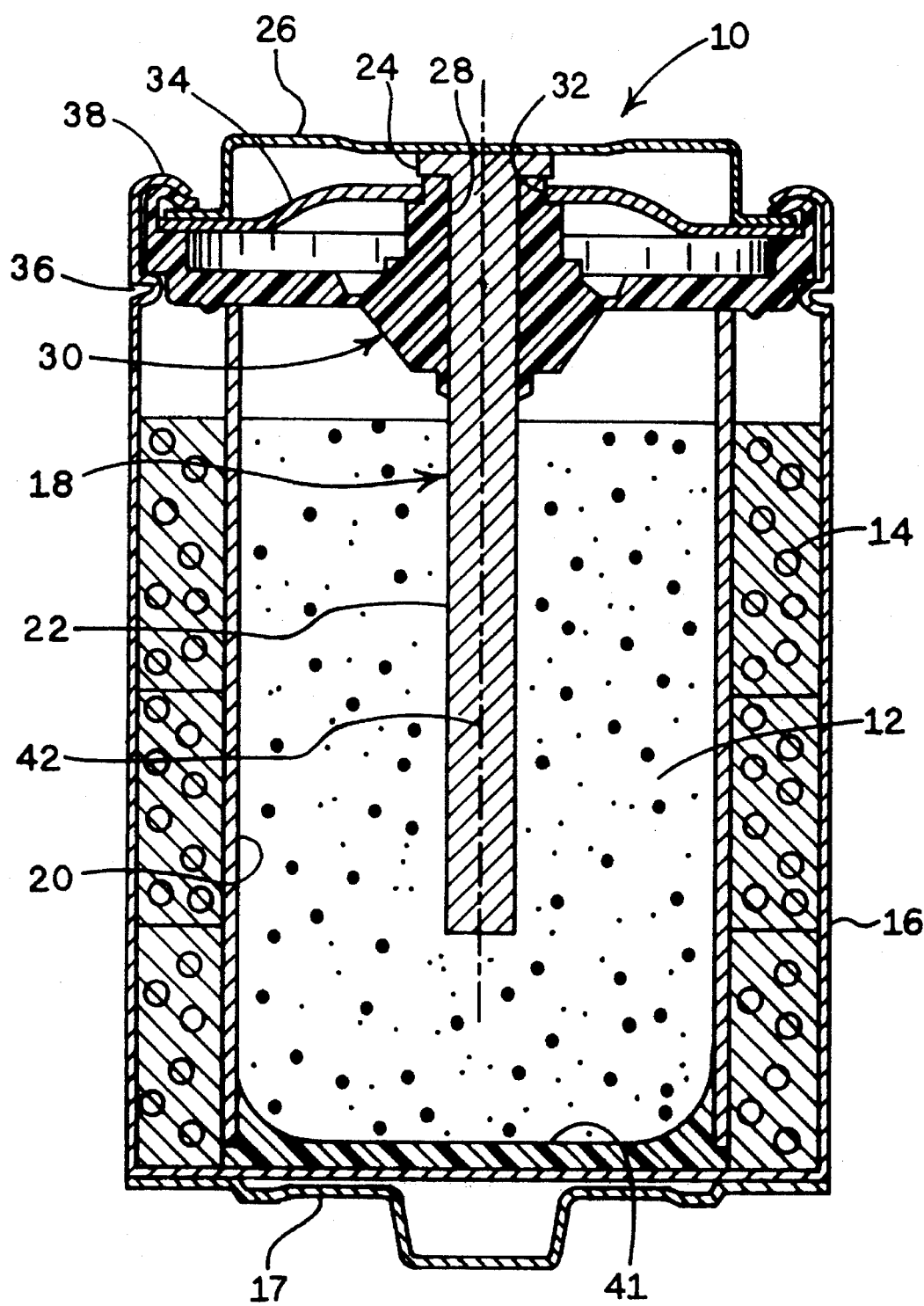
FIG. 1 shows cross-section of an electrochemical cell of the invention, including a cross-section of an anode current collector.

The invention is not limited in its application to the details of construction and the arrangement of the components set forth in the following description or illustrated in the drawings. The invention is capable of other embodiments or of being practiced or carried out in various ways. Also, it is to

DETAILED DESCRIPTION OF THE ILLUSTRATED EMBODIMENTS

Referring to FIG. 1, a rechargeable alkaline cell 10 of the invention includes an anode 12, including an anode mix comprised primarily of zinc, a cathode 14 comprised primarily of manganese dioxide, and an aqueous alkaline electrolyte. The anode, cathode, and electrolyte are housed in a container 16 for the cell, which also serves as the cathode current collector. Cathode cap 17 is secured to container 16 and serves as the cathode terminal. An anode current collector 18 is in intimate physical contact with the anode mix. A separator 20 is physically located between the anode and the cathode and insulates the anode and cathode from . direct physical contact with each other.

The cathode 14 generally comprises an admixture of electrolytic manganese dioxide, together with about 5% to about 15% by weight graphite. The cathode may also comprise certain inorganic or organic binder materials such as polyethylene, polytetrafluoroethylene (PTFE), polysulfone, or the like. In addition, the cathode mix can include a small amount of water or electrolyte, to facilitate pressure molding of the cathode mass, particularly for molding cylindrical pellet rings. All other conventionally-known cathode mix additives are also contemplated for use in the invention. Thus, the invention contemplates any cathode having conventionally known composition and structure.

For use in cylindrical cells, the cathode can be fabricated in the form of an extruded sleeve, or as a plurality of molded rings, as shown in FIG. 1. Molded rings are preferred.

The zinc anode 12 can be made of any of a number of well known zinc anode compositions, prepared according to respective known processes. Accordingly, zinc powder is mixed with other powdered or otherwise dry ingredients of the anode mix. Electrolyte is then added to the dry mixture, to form the gelled anode mix. Thereafter, the anode mix is placed into the cells. Thus, the invention contemplates any anode mix having conventionally known composition, and those made by any conventionally known process.

A first layer of the separator 20 can be, for example, cellophane. A second layer of the separator is generally wettable by the electrolyte, thereby to establish good electrical contact between the anode and cathode. Without limitation, typical composition for the second, wettable, layer is a nonwoven layer of woodpulp and synthetic polymers. In the alkaline cell, the electrolyte permeates the anode, the cathode, and the separator, providing electrochemical, but not physical, contact between the anode and cathode, through separator 20.

Current collector 18 includes an elongated shank 22 and a head 24 on one end of the shank. Head 24 is in intimate electrical contact with anode terminal 26. Preferably, current collector 18, and especially the shank 22, is symmetrically shaped. Most preferably, shank 22 is in the shape of a round rod.

The function of current collector 18 is to collect and conduct electrical energy flowing between the anode mix and anode terminal 26. The functioning of the current collector requires at least a minimum threshold amount of surface area on shank 22 in order to "collect" electric current. The minimum threshold amount will vary according to the cell specifications, and can be readily determined by those skilled in the art, for any otherwise-defined cell.

The outer surface of shank 22 is finished to a desired uniform surface smoothness, and is generally free of deviations from the general surface finish. Such deviations might be, for example, burrs, nicks, and scratches, which would add surface area and thus promote an unnecessary amount of gassing. Non-symmetrical current collectors can be used, provided accommodating modifications are made in cooperating ones of the other elements of the current collector assembly.

The anode current collector should efficiently collect current while taking up a limited amount of space in the container 16. Further, the anode current collector should conduct the current so collected to the anode terminal with minimal loss to internal resistance. Thus, the composition of current collector 18 should be a good conductor of electricity, as well as being an efficient "collector" of electricity.

In general, known and commonly used current collectors incorporate large fractions of copper in their compositions because copper is a cost effective, good conductor, having small internal resistance. For primary cells, discharge capacity for a single discharge is a prominent consideration in specifying the composition of the anode current collector. Oxidation of the anode current collector, on the other hand, is of little concern so long as no oxidation occurs that would impede operation of the cell until after the cell is fully discharged.

Pure copper is generally not satisfactory for use as current collector 18, even under primary cell conditions. Accordingly, it is known to mix or alloy the copper with zinc, and/or to plate the current collector with, for example, tin in order to obtain the desired collection and conduction properties in the current collector, without incurring unacceptable levels of oxidation of the current collector.

It is known to use, for example, any of a number of brass compositions for the current collector, such as 80% copper and 20% zinc by weight, 70% copper and 30% zinc, 65% copper and 35% zinc, and 60% copper and 40% zinc. Such brass compositions are sufficiently effective at suppressing oxidation that they are acceptable for use in primary cells which employ a single discharge cycle before being disposed of. In general, the higher the copper fraction, the lower the internal resistance in the current collector. Similarly, the lower the copper fraction, the higher the internal resistance. With respect to primary (disposable) alkaline cells, it is known to use an anode current collector composition comprising copper modified with silicon, and generally comprising 98% copper, 1.8% silicon, and 0.2% manganese.

During discharge of both primary and secondary cells, the desired, work-producing oxidation of the anode starts near the cathode and progresses toward the anode. The locus of such electrochemical reactions can, to a degree, be characterized as an advancing reaction front.

Significant oxidation of copper in the current collector generally does not occur during the normal work-producing part of the discharge cycle. Rather, significant oxidation of copper at the current collector occurs only after the advancing reaction front arrives at the current collector.

The inventors herein have observed that, under the severe test of Series Reversal, where polarity is "reversed" in the cell, copper in conventional anode current collectors can be oxidized to copper oxide. At least part of the copper oxide so formed may not be reduced back to elemental copper during the recharge portion of the cycle, whereby the oxidation to copper oxide represents an at least partially irreversible chemical reaction.

As used herein, "recharge," "charge", "recharging", "charging" and the like refer to known charge processes for consumer-size cells of e.g. "D," "C," "AA," and "AAA" sizes.

Referring to the above noted consumer-size cells, cells of the invention are typically quite portable sources of electrical power supply. Using a rechargeable secondary cell, such as the cells of the invention, rather than a disposable primary cell, provides for economy of use of resources while maintaining the portability of the power supply. Thus are rechargeable secondary electrochemical cells generally preferred over primary disposable cells.

Oxidation of copper to copper oxide in the current collector is of little or no consequence in primary cells. Specifically, substantial oxidation of the copper in general occurs only after access to the usable zinc has been interrupted, at which point the electrochemical utility of a primary cell has been exhausted. Accordingly, there is little or no oxidation of the copper during the period of intended use of the primary cell.

Such oxidation can occur, for example, under the above mentioned Series Reversal conditions, where two or more cells are connected in series to a load, and remain connected to the load even after the weakest one of the cells has been exhausted. In such case, the stronger cell or cells continue to discharge electricity, reversing polarity on the exhausted cell. Under those conditions, substantially all the usable zinc has already been oxidized to ZnO. In that case, the zinc electrode voltage effectively becomes more positive than the manganese dioxide electrode voltage. As additional oxidation is urged upon the anode, the copper in the current collector begins to oxidize, forming copper oxide. Thus the anode current collector corroded by the formation of copper oxide on its surface.

While formation of copper oxide on the outer surface of the anode current collector is of little consequence in a primary (single-use, disposable) cell, such corrosion is detrimental to recharging of secondary (rechargeable) cells. Accordingly, even though the irreversible reactions generally occur at a time when no useful work is being obtained from the cell, such cells typically have significantly reduced milliampere-hour capacity at recharge. Accordingly, such cells cannot receive a charge representative of the amount of energy which they were designed to receive, in view of their expected use life, if such reactions were substantially reversible.

In general, when a rechargeable alkaline zinc manganese dioxide cell is recharged, the charging converts zinc oxide to zinc, beginning at the separator, and progressing inwardly from the separator toward the anode current collector. The locus of the dynamic electrochemical reactions which convert the zinc oxide to zinc can, to a degree, be characterized as an advancing reaction front. During the recharging step, copper oxide at the anode current collector is not generally reduced to elemental copper. Rather, the copper oxide remains in the oxidized state, until the reaction front reaches the current collector. By that time, the recharging process is substantially complete. Accordingly, all, or nearly all, of the recharge current must either pass through any copper oxide corrosion at the anode current collector, or must by-pass the copper oxide in some manner, to reach unoxidized current collector material.

Thus, the above mentioned copper oxide acts as a poorly conducting electrical shield about the current collector during recharge. The high resistance of the copper oxide operates to reduce the rate at which the cell is recharged. In addition, the resistance embodied in the copper oxide shield may impede recharging the cell to its full mAhr capacity, whereby only a partial charge, measured in e.g. mAhr capacity, is obtained.

If the copper oxide is not reduced to elemental copper during recharge, the copper oxide remains as a poorly-conducting electrical shield during the discharge/use portion of the discharge/recharge cycle. Poor electrical conduction, and respective high internal resistance in the cell, result in poor cell performance because of high losses from the high internal resistance and because the cell may not accept recharge to its full designed mAhr potential capacity.

In some examples of corrosion of the anode current collector, observed by the inventors herein, at least part of the copper oxide shield flaked off the underlying unoxidized material of the current collector, providing a fresh, albeit high surface area, path between the zinc anode mix and the current collector material, exposed to the zinc anode electrochemical reaction medium, whereby recharging of the cell might well be accomplished. In such case, recharge could proceed substantially to completion, but continued use of such cell in discharge/recharge cycles may be accompanied by generation of excessive amounts of oxygen gas when the cell goes into the above-described "reversal."

The inventors herein believe that solubilized copper might be reduced to elemental copper during recharge. Excess copper in the anode gel typically results in additional gas generation during the life of the cell due to a copper-zinc couple.

The inventors have surprisingly discovered that, in rechargeable alkaline cells, the above described oxidation of the anode current collector, the accompanying formation of copper oxide, and generation of excess gas, are minimized by using an anode current collector comprising copper, modified with even very small amounts of silicon.

While even smaller amounts of silicon provide some affect, generally at least 0.5% by weight silicon is used to obtain at least minimal levels of suppression of oxidation. Accordingly, the composition of the current collector in cells of the invention is about 89% to about 99.5% by weight copper, and about 0.5% to about 11% by weight silicon.

Preferably, the composition is about 94% to about 99% by weight copper and about 1% to about 6% by weight silicon. A typical current collector composition also contains about 0.1% to about 0.5% by weight manganese.

A more preferred composition is about 95% to about 98% by weight copper and about 2% to about 5% by weight silicon. A still more preferred composition comprises about 95% to about 97.5% by weight copper and about 2.5% to about 5%. Most preferred compositions comprise about 2.8% by weight to about 4% by weight silicon. Those skilled in the art recognize that use of the term "about" in specifying the relative amounts of copper and silicon is instructive that minor amounts of other materials, including unintended impurities, may be contained in the composition of the anode current collector, especially where commercial grade raw materials are used as compared to laboratory grade materials.

Two exemplary current collector compositions are

| Composition #1 | | Composition #2 | |
|---|---|---|---|
| 98.0% | copper | 96.8% | copper |
| 1.8% | silicon | 2.9% | sil;icon |
| 0.2% | manganese | 0.3% | manganese |

In preferred embodiments, the current collector composition is an alloy wherein the ingredients are mutually dissolved in each other. However, mixtures having the same composition ranges, but in unalloyed or otherwise heterogeneous form, are also contemplated.

A preferred current collector for use in for example a D-size alkaline manganese dioxide cell of the invention is a nail wherein the shank is 0.080 to 0.082 inch diameter wire, either Composition #1 or Composition #2.

Shank 22 has a cross-section slightly larger than the cross-section of aperture 28 in seal body 30. Shank 22 can be pushed through aperture 28 with frictional engagement between the sidewall of aperture 28 and the outer surface of the shank.

Head 24 is welded at its top, or is otherwise secured physically and for electrical conduction, preferably to a central region of anode terminal 26.

In assembling an anode collector assembly, head 24 of current collector 18 is for example welded to the inside surface of anode terminal 26 as illustrated in FIG. 1. Shaft 22 of the current collector is then inserted through hole 32 of washer 34, and is driven through aperture 28 of the seal body 30, accompanied by frictional engagement between the shank and the sidewall of the aperture. A sealant is preferably placed on the portion of the shank which will be under the head and protruding into the seal body. Seal body 30 can be coated with a coating to protect the seal body from chemical action of the electrochemical reactants to be contained in the cell. The current collector assembly is then generally complete, and ready for use in the electrochemical cell.

A preferred embodiment of the cell 10 is assembled as follows. The desired number of manganese dioxide cathode rings are inserted into the cathode can as illustrated in FIG. 1. The cathode rings in the cathode can define, in combination, an empty central cavity for receiving the anode material thereinto. An appropriate separator 20 is inserted into the central cavity and expanded outwardly against the cathode rings. An electrical insulator disc or functionally similar electrically insulating material is applied at the bottom of separator 20 to electrically seal off the bottom of the anode cavity, preventing anode material placed therein from by-passing separator 20 and thereby shorting to the cathode or cathode can. A mass of such electrically insulating material is shown at 41 in FIG. 1.

An appropriate amount of zinc anode mix is then placed in the opening defined inside the separator to form anode 12. The combination of anode mix, cathode material, and separator then generally fill the cathode can, allowing head space for collection and recombination of gases generated during normal operation of the cell.

The anode current collector assembly is then emplaced in the can, driving the shank 22 of current collector 18 into the zinc anode mix 12. This brings the shank into electrical contact with the zinc anode mix. The zinc anode mix 12 is generally a gel consistency, sufficiently fluid to establish and maintain good electrical contact with current collector 18.

The can 16 is then crimped at groove 36 adjacent seal body 30; and the distal ends of the cathode can are crimped inwardly at 38. This urges the annular distal and of the can, and the annular distal edge of seal body 30 against the outer circumferential edge of anode terminal 26, and indirectly against the outer circumferential edge of washer 34. This crimping completes the closure of the cell, including the incorporation of the anode current collector assembly into the cell, thereby forming a desirably tight closure and seal of the cell.

The cathode cap 17, including the contact nubbin, is secured to the closed bottom of the cathode can.

FIG. 1 illustrates a finished cell as just described. As seen therein, central axis 42 of the anode current collector assembly serves as the central axis of the cell.

It is surprising that the small amount of no more than about 11% by weight silicon, preferably no more than about 5% by weight silicon, is effective to control the tendency of the copper to oxidize. Indeed, in the following examples the silicon is less than 3% by weight of the composition, and yet is effective to provide the oxidation-suppressing benefits taught herein. As noted there, the higher level of 2.9% silicon modification is preferred over the 1.8% level of silicon modification because of its superior capacity for suppressing oxidation of the current collector.

While choosing to not be bound by theory, the inventors anticipate that the benefits accruing to the novel cells of the invention relate to an unexplained ability of the small amount of silicon to prevent removal of the copper from the anode current collector (alloy) composition and/or to prevent oxidation of copper in the anode current collector.

As used herein, the chemically reactive environment includes the anode mix, including typical ingredients normally used in commercially available rechargeable alkaline cells, such as the alkaline electrolyte, and conductivity-enhancing additives, and the like.

ANODE POLARIZATION

A brass nail and two different silicon-modified copper nails were anodically polarized at 0.2 millivolts per second (mv/s) in aqueous potassium hydroxide electrolyte comprising 38% by weight potassium hydroxide and 3% by weight zinc oxide. During polarization, only the cross section of the nail (2 mm diameter) was exposed to the electrolyte. Hg/HgO was used as a reference electrode and platinum as the counter electrode. The samples were prepared as follows. Sample nails were press fitted into a polytetrafluoroethylene (Teflon®) holder and then ground and polished to a final surface finish with 0.05 micron alumina powder. The samples were then cleaned with acetone and water. The brass alloy was 70% copper, 30% zinc. The silicon-modified copper nails had the above Compositions #1 and #2.

Figure 2:
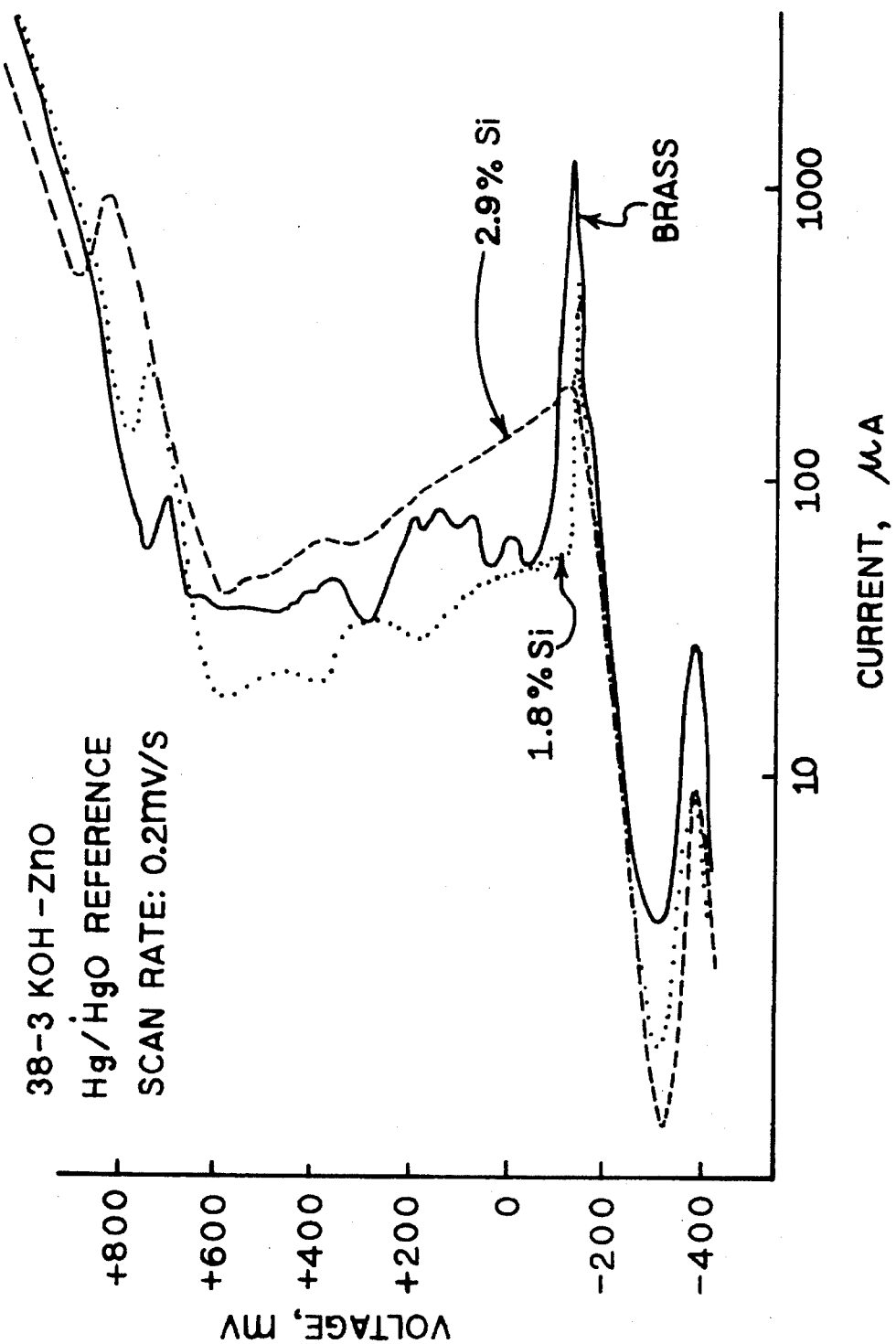
FIG. 2 is a graphical representation showing anodic polarization behavior of anode current collectors used in cells of the invention, as compared to conventional anode current collectors.

In general, the polarization behavior of the three samples resembled the polarization behavior of pure copper. However, the silicon-modified samples gave lower current values than the brass sample. This was particularly noted for currents corresponding to the two main copper oxidation peaks at approximately −400 mv and −150 mv, as illustrated in FIG. 2. In the case of copper, these peaks are thought to be due to the formation of $Cu_2O$ and $Cu(OH)_2$, respectively. The lower current values obtained from the silicon-modified copper samples suggest that less metal is dissolved into the aqueous KOH solution from the silicon-modified samples than from the brass sample, prior to formation of the oxide products. FIG. 2 thus illustrates the unexplained ability of small amounts of silicon additive in copper, even as little as about 3% or less, to effectively suppress dissolution of copper from the nail whereas 30% zinc additive in the copper (10 times more additive) is not effective to suppress such dissolution.

The two silicon-modified copper samples of the invention showed some differences with respect to each other in their polarization behavior. These differences were most noticeable at the −150 mv peak. At this voltage, the higher silicon modification produced only about 220 μA of current while the lower silicon modification produced about 480 μA of current. The corresponding current value for the brass sample at that voltage was about 1200 μA.

EXAMPLES

Size "D" electrochemical cells were made with anode current collectors using the above Compositions #1 and #2. Control cells were made with brass anode current collectors comprising 70% copper and 30% zinc.

The cathode material was a mixture of $MnO_2$, graphite, conventional additives, and aqueous KOH. The anode material was a mixture of zinc powder, an organic corrosion inhibitor, indium compound, gelling agent, and aqueous KOH. The separator had a first cellophane layer and a second nonwoven layer of a combination of woodpulp and synthetic polymers. The cathode can was nickel-plated steel, with carbon coating on the nickel.

The above cells were subjected to two severe drain tests, in order to demonstrate the benefits of the silicon-modified anode current collectors in rechargeable alkaline cells. In the first test, individual cells were placed on a discharge/charge cycle comprising loading, and thereby discharging, each cell at 2.2 ohms for 24 hours, followed by 24 hours of recharge. Recharging was accomplished using a conventional charging process. Then the cycle was repeated. After five repetitions of the discharge/charge cycle, increase in height was measured on each cell, to obtain a measure of cell expansion caused by release of gas in the cell. Height was measured again after 2 weeks rest. The increase in height is shown for each cell in Table 1. The results of these tests are represented in Table 1 following as the "4×24" test.

In the second test, 3 cells were placed on a discharge/charge cycle comprising loading, and thus discharging, 3 cells in series at 2.2 ohms, each cell, for 24 hours. The cells were then individually recharged for 24 hours. Then the cycle was repeated. After five repetitions of the discharge/charge cycle, increase in height was measured on each cell, to obtain a measure of cell expansion caused by release of gas in the cell. Height was measured again after 2 weeks rest. The increase in height is shown for each cell in Table 1. The results of this test are represented in Table 1 following as the "Series Reversal" test.

TABLE 1

| Collector Composition | EXPANSION | |
|---|---|---|
| | 5-Cycles | 5-Cycles + 2Wks Rest |
| 24X24 Test | | |
| Control Brass | .0405 inch | .0300 inch |
| Composition #1 | .0290 inch | .0215 inch |
| Composition #2 | .0360 inch | .0260 inch |
| Series Reversal Test | | |
| Control Brass | .0515 inch | .0415 inch |
| Composition #1 | .0360 inch | .0215 inch |
| Composition #2 | .0310 inch | .0195 inch |

Further tests not detailed here showed the cells using Compositions #1 and #2 of the invention capable of at least 25 complete discharge/charge cycles while maintaining commercially acceptable levels of electrochemical capacity.

As seen in Table 1, the cells having the silicon modified current collectors showed substantially less expansion than the cells using the brass anode current collectors. Further, the cells of the invention, after the 2-weeks rest, showed no greater expansion as a result of the Series Reversal test than they did as a result of the "24×24" test. By contrast, the control cell embodiment showed greater expansion in the Series Reversal test than in the "24×24" test, both before and after the 2 weeks rest.

After the tests were completed, representative cells were opened and inspected for corrosion of the anode current collector. The control cells showed significant corrosion of the brass current collectors. The cells of the invention showed no significant corrosion of the silicon-modified current collectors.

The inventors conclude, from the absence of corrosion, that (i) less irreversible chemical reactions had taken place with respect to the anode current collectors of the invention, whereas (ii) more irreversible corrosion-related chemical reactions had taken place with respect to the brass current collectors of the control cells.

Applicants acknowledge the usual unintended side reactions that always occur in commercial grade battery materials due to impurities in the electrochemical reactants. However, for purposes of addressing reversible versus irreversible reactions, both here and in the claims that follow, reactions due to such normal levels of impurities are not considered.

Those skilled in the art will now see that certain modifications can be made to the articles, apparatus, and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:
1. A rechargeable alkaline electrochemical cell, comprising:
  (a) a cathode;
  (b) a cathode current collector in electrical contact with the cathode;
  (c) a zinc anode, said zinc anode including a chemically reactive anode mix comprising zinc, and thereby engendering a chemically reactive anode environment;
  (d) a functionally operable anode current collector in electrical contact with said anode mix, said anode current collector comprising copper, and about 0.5% by weight to about 11% by weight silicon;
  (e) an alkaline electrolyte; and
  (f) a separator separating said zinc anode and said cathode.
2. A rechargeable alkaline electrochemical cell as in claim 1, said anode current collector comprising about 1% by weight to about 6% by weight silicon.

3. A rechargeable alkaline electrochemical cell as in claim 1, said anode current collector comprising about 2% by weight to about 5% by weight silicon.

4. A rechargeable alkaline electrochemical cell as in claim 1, said anode current collector comprising about 2.8% by weight to about 4% by weight silicon.

5. A rechargeable alkaline electrochemical cell as in claim 1, said anode current collector further comprising about 0.1% by weight to about 0.5% by weight manganese.

6. A rechargeable alkaline electrochemical cell as in claim 1, said anode current collector comprising about 98% by weight copper, about 1.8% by weight silicon, and about 0.2% by weight manganese.

7. A rechargeable alkaline electrochemical cell as in claim 1, said anode current collector comprising about 96.8% by weight copper, about 2.9% by weight silicon, and about 0.3% by weight manganese.

8. A rechargeable alkaline electrochemical cell as in claim 6, said anode current collector having a shaft extending into said anode mix, the recited composition of said anode current collector extending the full, length of said shaft.

9. A rechargeable alkaline electrochemical cell as in claim 7, said anode current collector having a shaft extending into said anode mix, the recited composition of said anode current collector extending the full length of said shaft.

10. A rechargeable alkaline electrochemical cell as in claim 1, the recited composition of said anode current collector being substantially constant throughout said anode current collector.

11. A rechargeable alkaline electrochemical cell as in claim 2, the recited composition of said anode current collector being substantially constant throughout said anode current collector.

12. A rechargeable alkaline electrochemical cell as in claim 1, milliampere hour reaction capacity of said electrochemical cell being limited, by the amount of said zinc in said anode mix, to one electron discharge in said cathode.

13. A rechargeable alkaline electrochemical cell as in claim 2, milliampere hour reaction capacity of said electrochemical cell being limited, by the amount of said zinc in said anode mix, to one electron discharge in said cathode.

14. A rechargeable alkaline electrochemical cell as in claim 4, milliampere hour reaction capacity of said electrochemical cell being limited, by the amount of said zinc in said anode mix, to one electron discharge in said cathode.

15. A rechargeable alkaline electrochemical cell as in claim 1, said separator comprising a first barrier layer, and a second layer.

16. A rechargeable alkaline electrochemical cell as in claim 2, said separator comprising a first cellophane layer, and a second layer.

17. A rechargeable alkaline electrochemical cell as in claim 4, said separator comprising a first cellophane layer, and a second layer.

18. A rechargeable alkaline electrochemical cell as in claim 1, said cell proceeding through substantially only chemically reversible reactions during normal discharge and charge stages of the discharge/charge cycle.

19. A rechargeable alkaline electrochemical cell as in claim 2, said cell proceeding through substantially only chemically reversible reactions during normal discharge and charge stages of the discharge/charge cycle.

20. A rechargeable alkaline electrochemical cell as in claim 4, said cell proceeding through substantially only chemically reversible reactions during normal discharge and charge stages of the discharge/charge cycle.

* * * * *